(12) United States Patent
Johnson et al.

(10) Patent No.: US 10,376,042 B1
(45) Date of Patent: Aug. 13, 2019

(54) WALL-MOUNTED WORKSTATION SLIDING GUIDE ASSEMBLY

(71) Applicants: Simon Nicholas Johnson, Rowlett, TX (US); Michael John Sears, Dallas, TX (US)

(72) Inventors: Simon Nicholas Johnson, Rowlett, TX (US); Michael John Sears, Dallas, TX (US)

( * ) Notice: Subject to any disclaimer, the term of this patent is extended or adjusted under 35 U.S.C. 154(b) by 0 days.

(21) Appl. No.: 15/395,394

(22) Filed: Dec. 30, 2016

(51) Int. Cl.
| | |
|---|---|
| A47B 96/14 | (2006.01) |
| A47B 21/04 | (2006.01) |
| A47B 21/02 | (2006.01) |
| F16M 13/02 | (2006.01) |
| F16M 11/04 | (2006.01) |
| F16M 11/06 | (2006.01) |
| A47B 21/06 | (2006.01) |

(52) U.S. Cl.
CPC .............. *A47B 21/04* (2013.01); *A47B 21/02* (2013.01); *A47B 21/06* (2013.01); *F16M 11/046* (2013.01); *F16M 11/06* (2013.01); *F16M 13/02* (2013.01); *A47B 96/1466* (2013.01); *A47B 2200/0076* (2013.01)

(58) Field of Classification Search
USPC .......... 248/125.1, 125.2, 123.11, 123.2, 121, 248/317, 327, 331, 337; 211/103, 187; 108/144.11, 147.11, 149
See application file for complete search history.

(56) References Cited

U.S. PATENT DOCUMENTS

| | | | | |
|---|---|---|---|---|
| 3,533,583 | A * | 10/1970 | Azim | F16M 11/08 248/124.2 |
| 3,822,848 | A * | 7/1974 | Hopkins | F16M 11/046 248/279.1 |
| 5,007,608 | A * | 4/1991 | Carroll, Jr. | A47B 57/34 248/297.21 |
| 6,783,105 | B2 | 8/2004 | Oddsen, Jr. | |
| 6,957,794 | B2 * | 10/2005 | Landreville | F16M 11/2085 248/123.2 |
| 7,048,242 | B2 * | 5/2006 | Oddsen, Jr. | F16M 11/10 248/279.1 |
| 7,063,296 | B2 * | 6/2006 | Williams | F16M 11/10 248/244 |
| 7,195,213 | B2 * | 3/2007 | Weatherly | A47B 81/061 248/124.1 |
| 7,997,211 | B2 | 8/2011 | Peterson et al. | |
| D662,398 | S * | 6/2012 | Jahnke | D8/355 |
| 8,441,782 | B2 | 5/2013 | Thomas | |
| 8,567,735 | B2 | 10/2013 | Burgess et al. | |

(Continued)

*Primary Examiner* — Alfred J Wujciak
(74) *Attorney, Agent, or Firm* — Law Office of Sam Sokhansanj PLLC

(57) ABSTRACT

A wall-mounted workstation support assembly that allows users of various heights to quickly, safely, and easily vertically adjust the height of one or more peripherals, monitors, keyboards, and various computing devices. In one aspect, the workstation support assembly includes an elongated track, a first mount having a first guide, wherein the first guide is configured to slide along the elongated track, and a lift and release member. Here, the lift and release member can further include a handle, a first bracket, and a friction member secured to the bracket, wherein the friction member is configured to engage the elongated track and prevent the first mount from sliding along the track.

13 Claims, 13 Drawing Sheets

(56) References Cited

U.S. PATENT DOCUMENTS

| | | | | |
|---|---|---|---|---|
| 8,596,591 | B2* | 12/2013 | Theis | F16M 11/18 |
| | | | | 248/121 |
| 8,616,136 | B2 | 12/2013 | Burgess et al. | |
| 8,888,056 | B2* | 11/2014 | Lu | F16M 11/2014 |
| | | | | 248/123.11 |
| 9,125,502 | B2* | 9/2015 | Gwag | A47F 5/0884 |
| 2011/0233350 | A1* | 9/2011 | Burgess | F16M 11/10 |
| | | | | 248/123.11 |
| 2012/0228440 | A1* | 9/2012 | Jahnke | F16M 11/10 |
| | | | | 248/125.1 |
| 2012/0248263 | A1* | 10/2012 | Grotenhuis | A47B 21/02 |
| | | | | 248/123.2 |
| 2016/0120303 | A1* | 5/2016 | Constantino | F16M 11/42 |
| | | | | 108/28 |

* cited by examiner

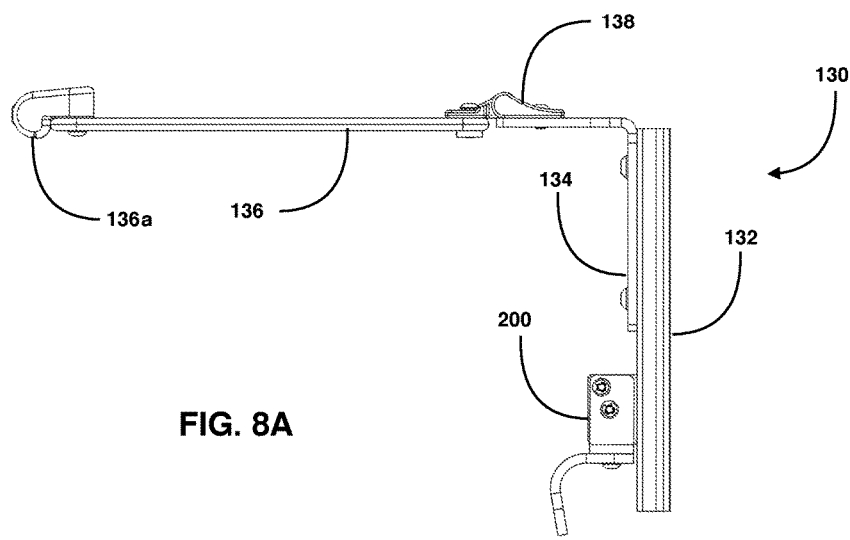
FIG. 8A
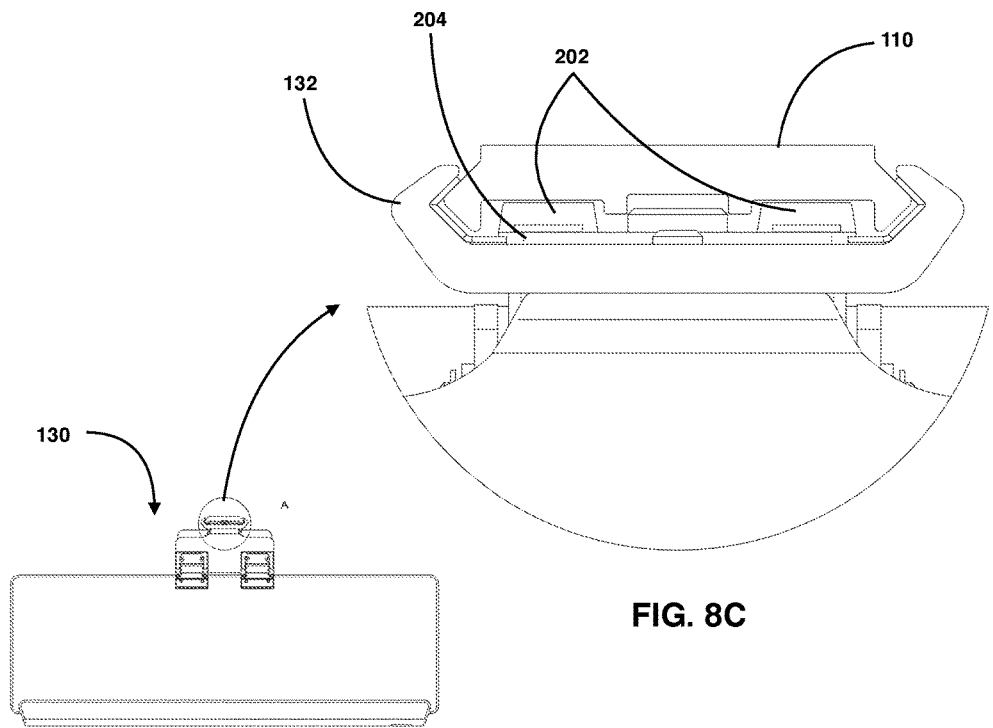
FIG. 8C
FIG. 8B

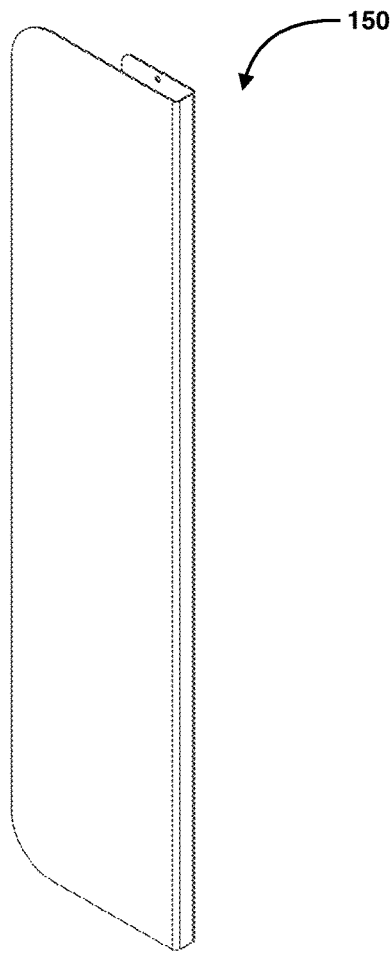
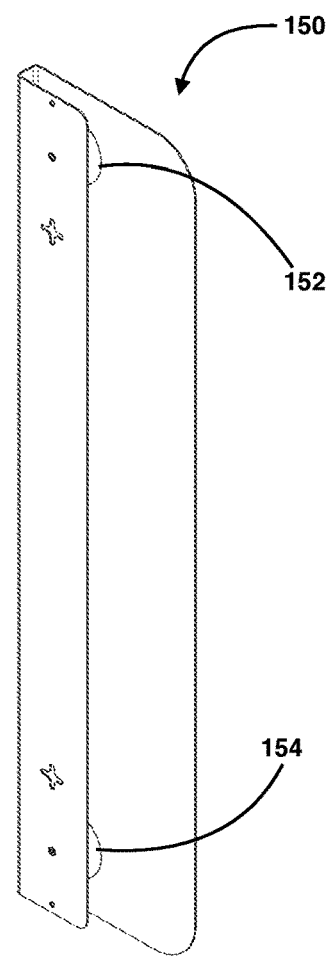
FIG. 9A  FIG. 9B
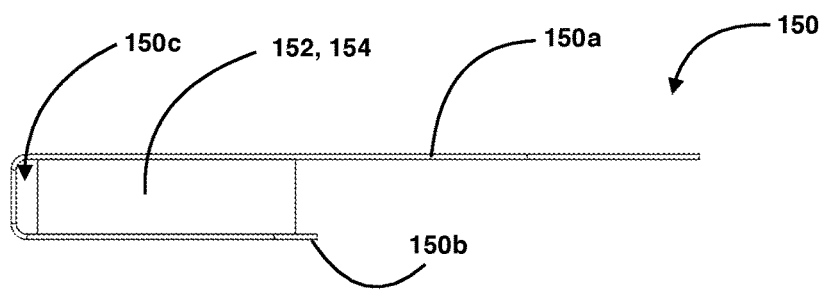
FIG. 9C

WALL-MOUNTED WORKSTATION SLIDING GUIDE ASSEMBLY

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Workstation mounting assemblies adapted to support computer monitors or computer keyboards encompass a wide variety of designs that are adapted to be used in various work settings. Many of these designs are specifically adapted to be used within a specific work environment. For example, one such work environment can be for the medical industry, such as in hospital or patient care environments. Generally, conventional wall-mounted workstation assemblies have been typically large in design and cumbersome to use. Moreover, these units do not provide adequate vertical adjustability to the users to allow easy and quick access to computer peripherals, such as the keyboard, mouse, or monitor.

Hence, what is desired is a wall-mounted workstation assembly that allows users, whether seated or standing, a full range of various heights to quickly, safely, easily, and independently adjust the height of one or more peripherals, monitors, keyboards, and various computing devices.

BRIEF SUMMARY

In one aspect of the present disclosure described herein, a wall-mounted workstation support assembly is disclosed that allows users of various heights to quickly, safely, and easily vertically adjust the height of one or more peripherals, monitors, keyboards, and various computing devices, among other advantages. In particular, a workstation support assembly is disclosed having an elongated track, a first mount having a first guide, wherein the first guide is configured to slide along the elongated track, and a lift and release member. Here, the lift and release member can further include a handle, a first bracket, and a friction member secured to the bracket, wherein the friction member is configured to engage the elongated track. In addition, the handle is configured to engage or disengage the friction member from the elongated track.

In another aspect of the disclosure described herein, a workstation support assembly is disclosed having an elongated track, a first mount having a first sliding guide, wherein the first sliding guide is configured to slide along the elongated track, and a release member. Here, the release member can include a handle, a first bracket, a friction member secured to the first bracket, wherein the friction member is configured to engage the elongated track. Further, the handle can be configured to engage or disengage the friction member from the elongated track. In addition, the first mount can be configured to support one or more of a display, keyboard, mouse, user input device, and computing device. Further, the friction member can be comprised of a rubber or polymer based pad. The assembly can also include a second bracket, wherein the second bracket is secured to the first bracket. In addition, a compression spring can be disposed between the first bracket and the second bracket. Further, the first bracket can be configured to pivot relative to the second bracket. The first mount can further include a keyboard support tray, wherein the keyboard support tray is further configured to pivot relative to the first mount. The first mount can further include a monitor or display support member. The assembly can also include a cover for one or more cables or cords, wherein the cover can include a first spool and a second spool configured to support the one or more cables or cords. In addition, the first and second spool can at least partially secure the one or more cables or cords.

In another aspect of the disclosure described herein, a workstation support assembly is disclosed having an elongated track or rail, a first carrier, wherein the first carrier is configured to slide along the elongated track, and a stop member. Here, the stop member can include a handle, a bracket, and a friction member secured to the bracket, wherein the friction member can be configured to or operable to engage the elongated track. In addition, the handle can be configured or operable to engage or disengage the friction member from the elongated track. In addition, the assembly can include a block member, wherein the block member can be secured to the bracket. Further, a compression spring can be disposed between the bracket and the block member. Here, the bracket can be configured to or operable to pivot relative to the block member. In addition, the assembly can include a cable management apparatus, wherein the cable management apparatus can include an L-shaped cover configured to conceal one or more cables or cords. Here, the cable management apparatus comprises a first cable support member and a second cable support. Further, the first and second cable support members can at least partially secure and affix the cables.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 8A illustrates a side view of the keyboard support mount and lever lift and guide assembly of the disclosure described herein.

FIG. 8B illustrates a top view of the keyboard support mount of the lift and guide assembly of the disclosure described herein.

FIG. 8C illustrates a partial close-up top view of the keyboard support mount of the lift and guide assembly of the disclosure described herein.

FIG. 9A illustrates a perspective front view of a cable management apparatus of the disclosure described herein.

FIG. 9B illustrates a perspective rear view of the cable management apparatus of the disclosure described herein.

FIG. 9C illustrates a top view of the cable management apparatus of the disclosure described herein.

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Figure 1:
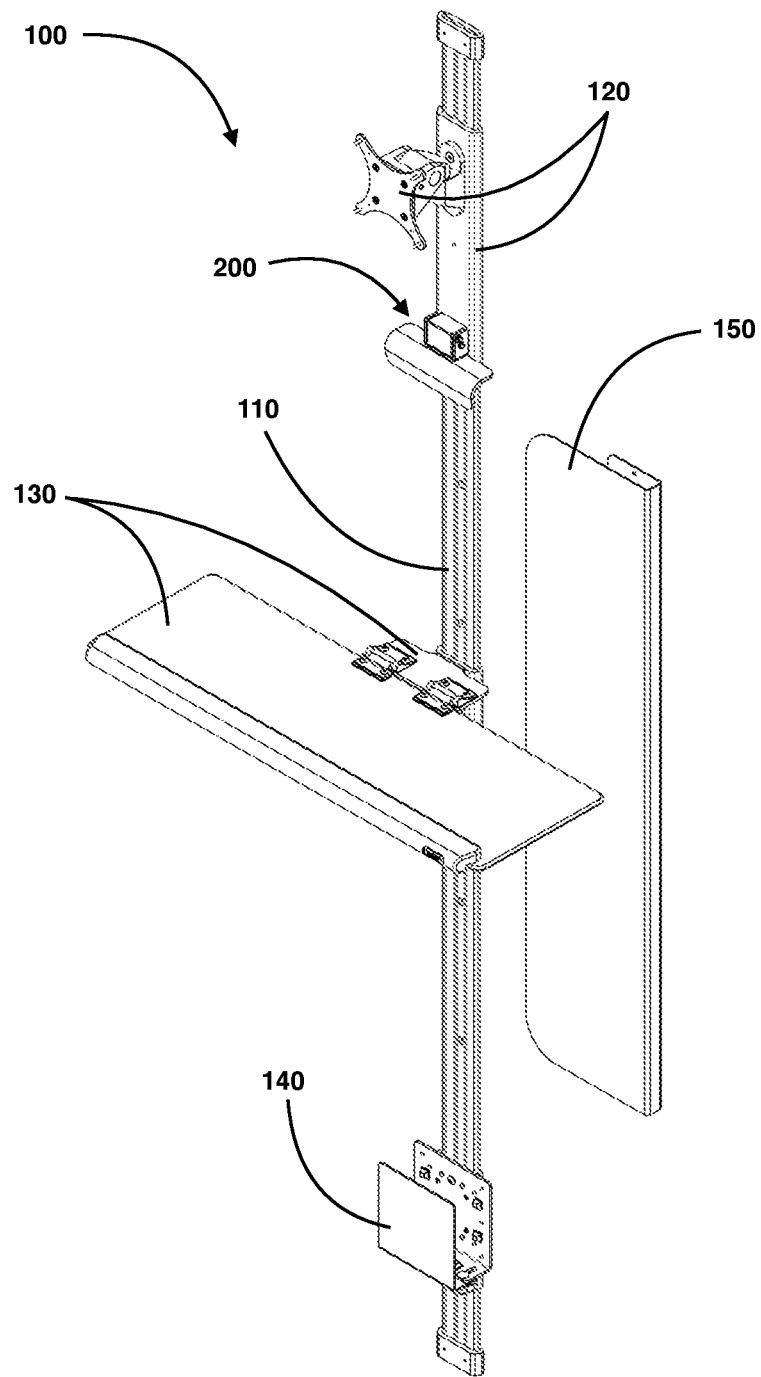
FIG. 1 illustrates a perspective view for one non-limiting embodiment of the wall-mounted workstation sliding guide assembly of the disclosure described herein.
Figure 2A:
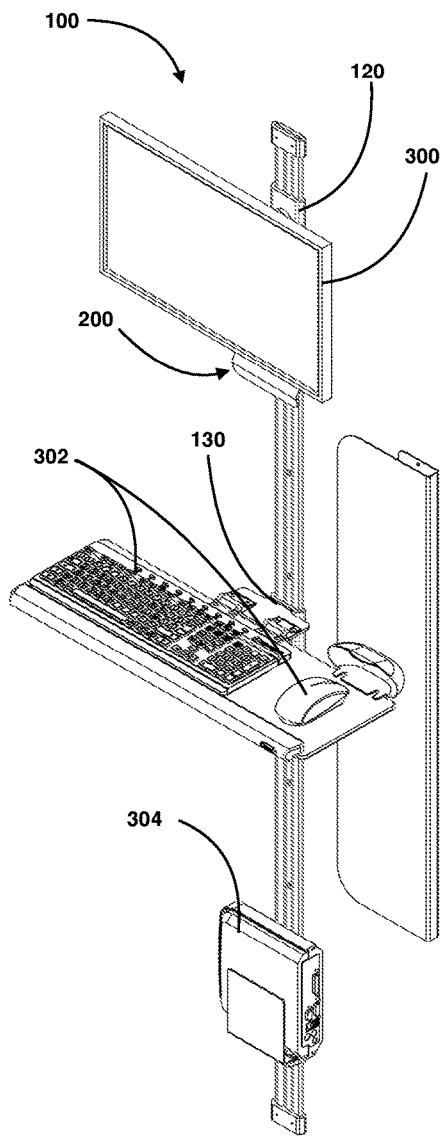
FIG. 2A illustrates a perspective view of the wall-mounted workstation sliding guide assembly of the disclosure described herein shown with computing peripheral units secured thereto.
Figure 2B:
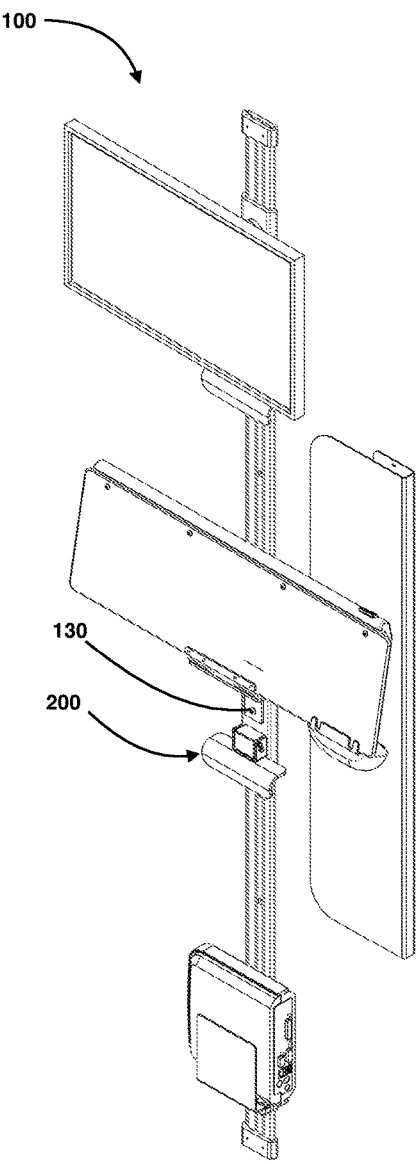
FIG. 2B illustrates a perspective view of the wall-mounted workstation sliding guide assembly of the disclosure described herein shown with computing peripheral units secured thereto, and further illustrating a keyboard support guide in a stowed position.
Figure 3A:
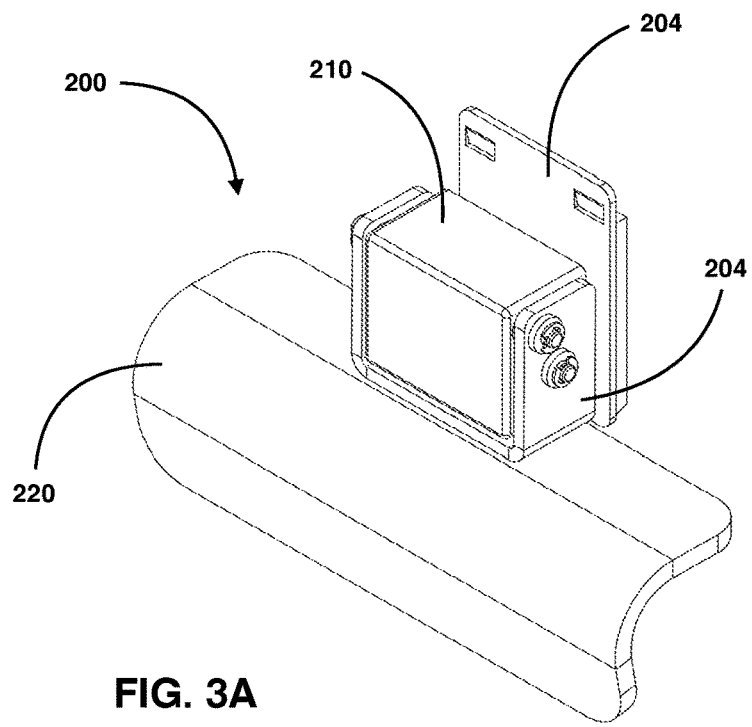
FIG. 3A illustrates a front perspective view for one non-limiting embodiment of a lift lever and guide of the disclosure described herein.
Figure 3B:
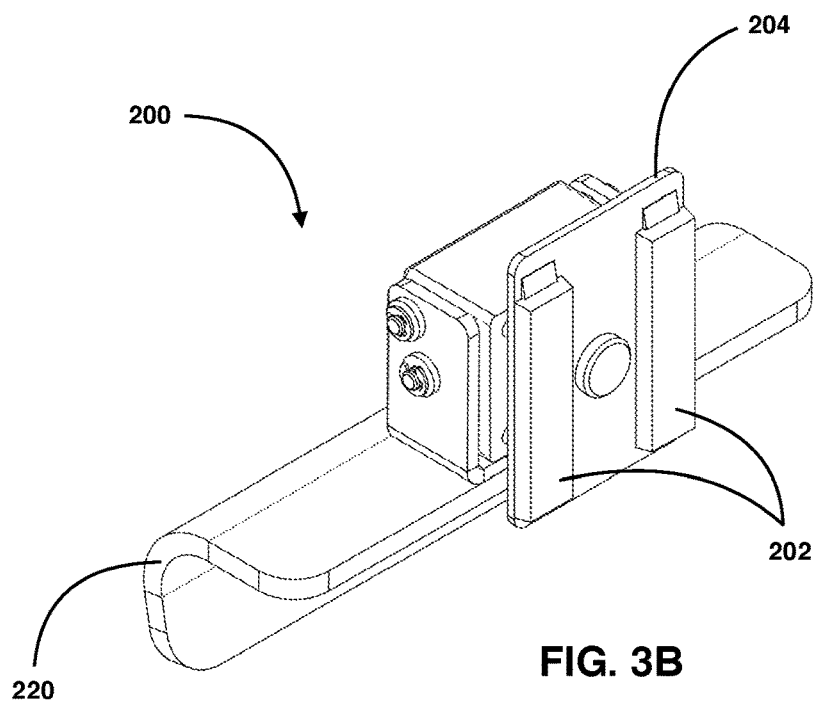
FIG. 3B illustrates a rear perspective view of the lift lever and guide of the disclosure described herein.
Figure 11A:
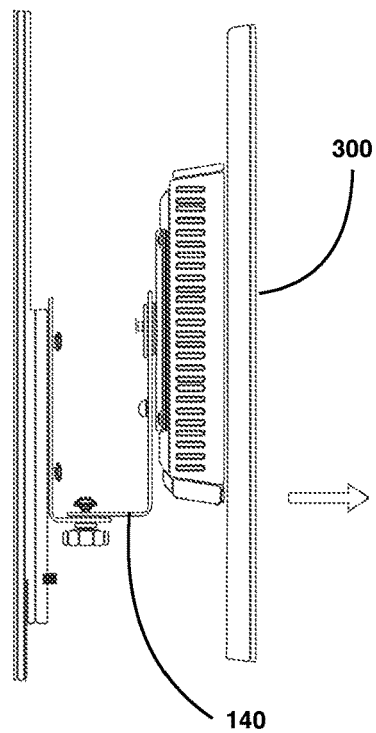
FIGS. 11A-11B illustrate side views for another non-limiting embodiment for a slidable support mount supporting both a display monitor and a computing device.
Figure 11B:
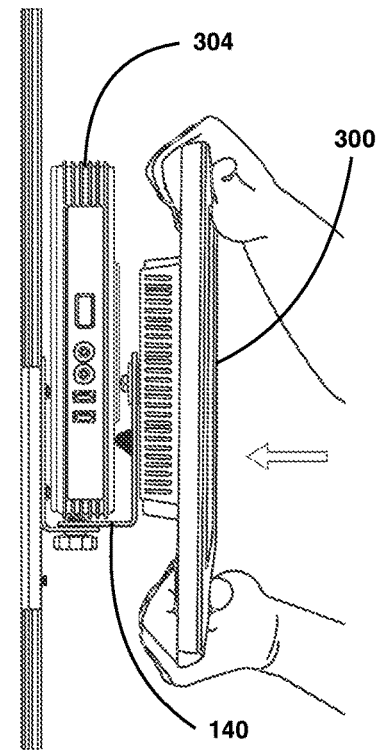

FIGS. 1-2B illustrate one non-limiting embodiment of the wall-mounted workstation sliding guide mounting assembly of the disclosure described herein. Here, wall-mounted assembly 100 can include an elongated vertically positioned guided rail or track 110 secured to a wall or a flat surface (not shown). In addition, assembly 100 includes a monitor or display sliding mount or carrier 120 for supporting display 300, wherein mount 120 further includes a lever actuated lifting device 200 (hereinafter after lever lift 200) for manually raising and lowering the monitor mount 120. Here, monitor mount 120 is further shown secured to track 110 and is slidable with respect to track 110. Assembly 100 can also include a slidable keyboard support mount or carrier 130 that further includes the lever lift 200 for raising and lowering the keyboard mount 130 and peripherals 302. Here, it is contemplated within the scope of the disclosure described herein that keyboard mount 130 can not only support a keyboard but any peripheral device or computing device, such as a mouse, touch based user input device, portable tablet or computing device, haptic feedback input device, voice recognition device, artificial intelligence (AI) input or feedback device, gesture, among others. Further, keyboard support mount 110 can be configured with a hinge to allow the keyboard tray to be stowed away and provide a low profile, as shown in FIG. 2B. Assembly 100 can further include a computing device or thin client slidable support mount or carrier 140 for supporting computing device hardware, hub, or client/server machine 304, which can also include the lever lift 200 (not shown) for raising and lowering support mount 140. In addition, as an alternative to monitor mount 120, the computing device mount 140 can also be configured to support both a monitor/display and a computing device, as shown in FIGS. 11A-11B.

FIGS. 3A-6B illustrate various views for the lever lift 200 of the disclosure described herein. Referring to FIGS. 3A-5B, lever lift 200 generally includes an arcuate or curved hand lever 220 secured to a pivoting bracket 204 which is further secured to a fixed block or bracket 210. In addition, bracket 210 is further secured to an upright friction braking bracket 204 having either a single or a pair of rubber or polymer based braking or friction pads 202 secured and affixed thereto, wherein pads 202 engage the surface of track 110 (or engage channels or grooves within track 110) to operate as a stop and prevent lever 200 and the mount it is supporting, such as mount 120 or 130, from sliding downwards on track 110.

Figure 5A:
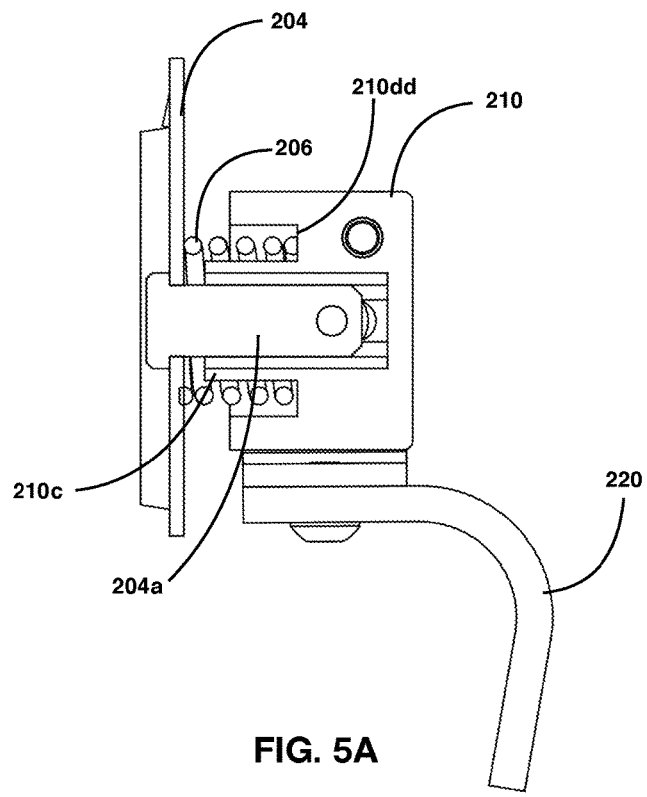
FIG. 5A illustrates cross-sectional side view of the lift lever of the disclosure described herein.
Figure 5B:
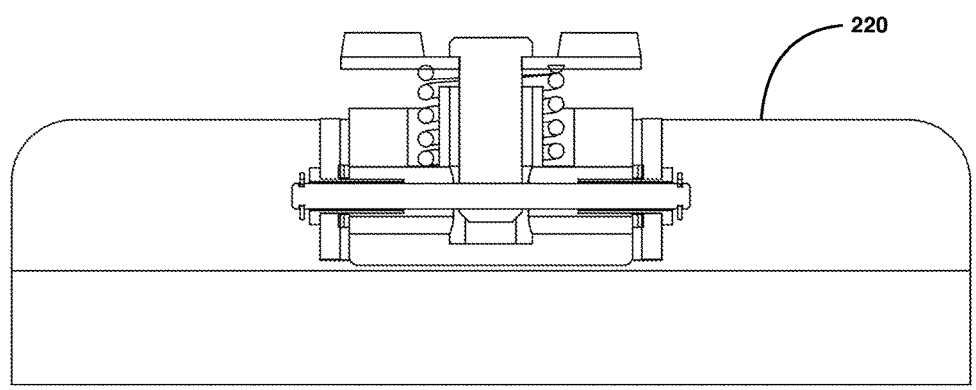
FIG. 5B illustrates a cross-sectional top view of the lift lever of the disclosure described herein.
Figure 5C:
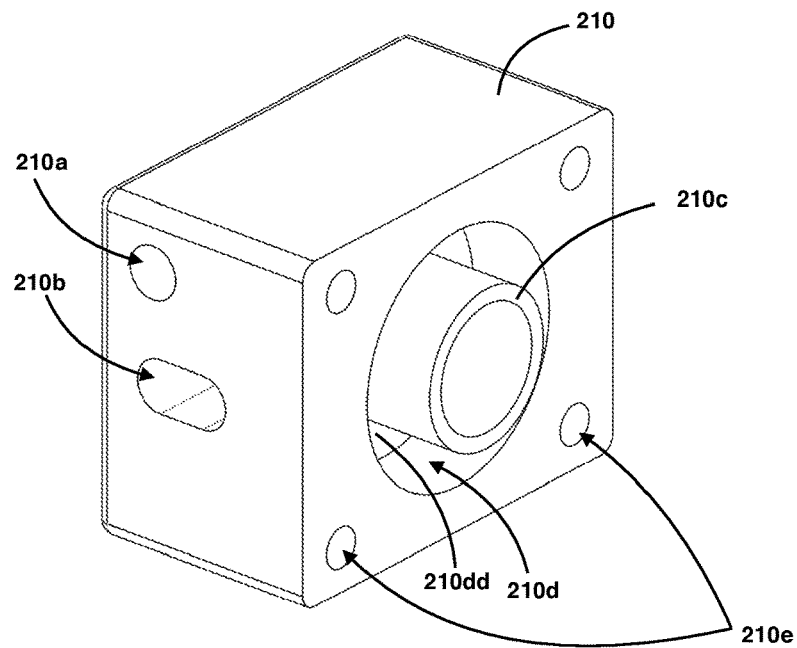
FIG. 5C illustrates a perspective rear view of a bracket for the lift lever of the disclosure described herein.
Figure 5D:
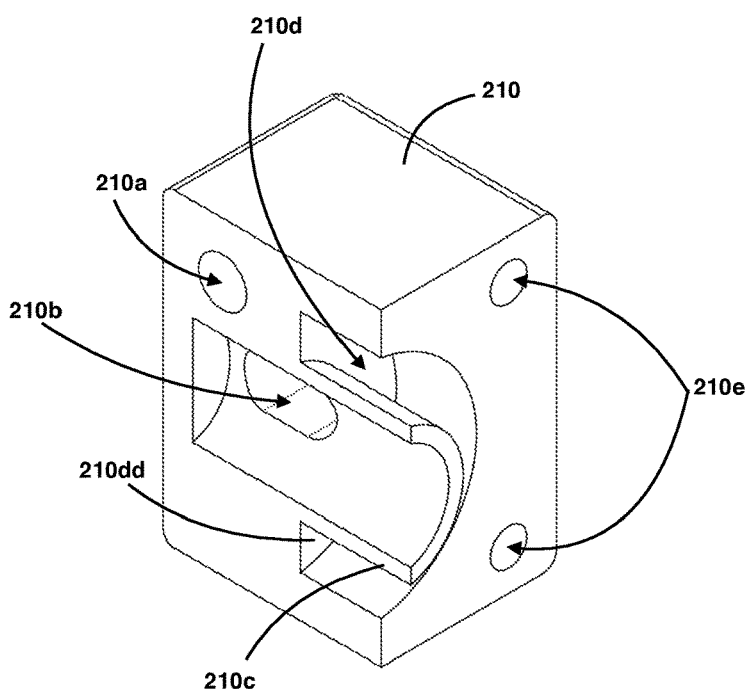
FIG. 5D illustrates a cross-sectional perspective rear view of the bracket of FIG. 5C.

FIGS. 5C-5D illustrate various rear views of block or bracket 210 of lever lift 200. Specifically, bracket 210 includes openings or channels 210a and 210b that extend through and out of each side of block or bracket 210, whereby their function will be described in detail later in this disclosure. In addition, block or bracket 210 further includes a cylindrical hollow protrusion 210c which further defines an annular space 210d between body of block 210 and protrusion 210c. In particular, annular space 210d is configured to at least partially receive compression spring 206 therein, wherein compression spring 206 is disposed over protrusion 210c and one end of the spring 206 is abutted against wall 210dd, as shown in FIG. 5A. In addition, the interior hollow opening of protrusion 210c is configured to receive protrusion 204a of bracket 204, as also shown in FIG. 5A. Block or bracket 210 is also shown having a plurality of apertures 210e for receiving fasteners, such as fasteners 208, that secure block or bracket 210 to either guide 122 or 130, as shown in FIG. 6B, wherein guides 122 or 133 are further secured to main track 110 of assembly 100.

Figure 6A:
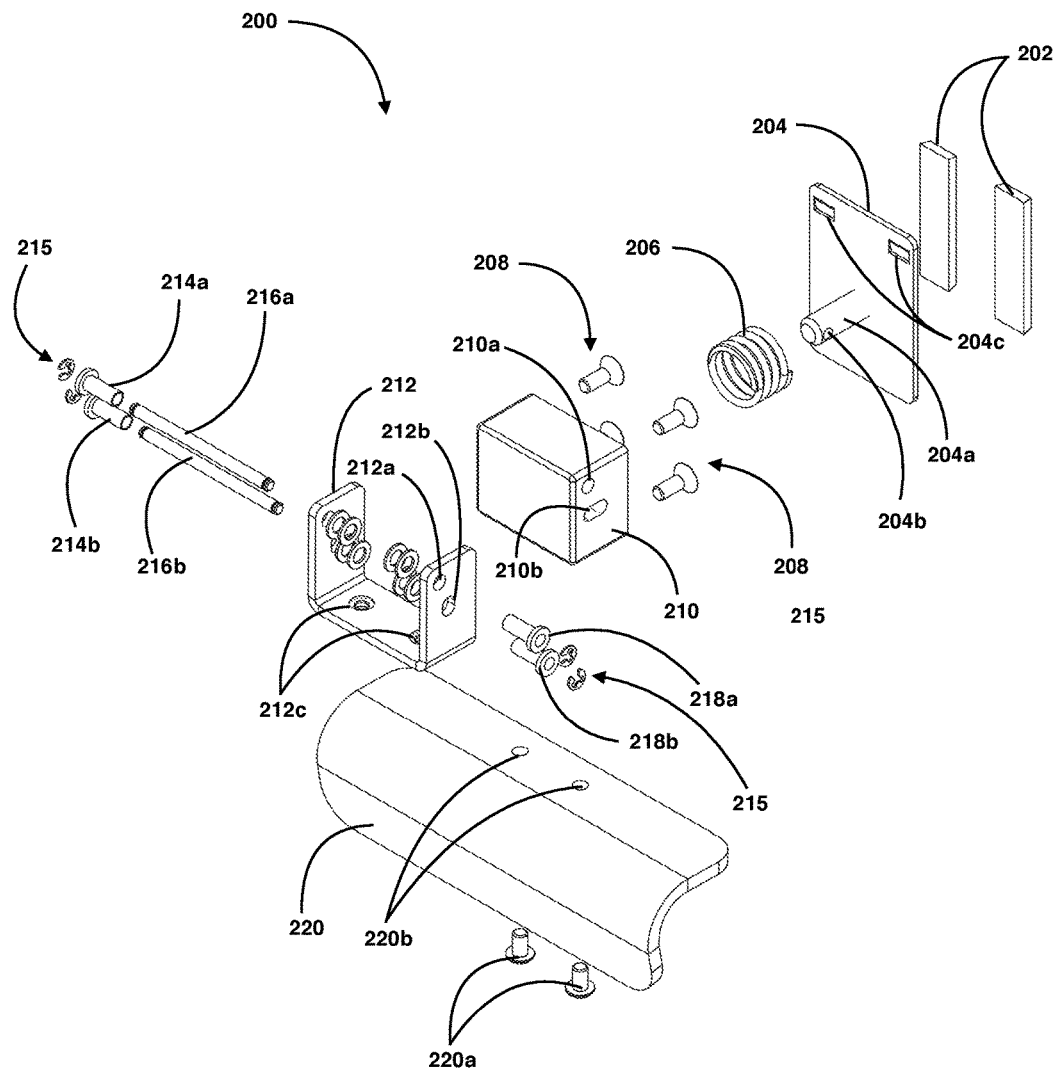
FIG. 6A illustrates an exploded view of the lift lever of the disclosure described herein.
Figure 6B:
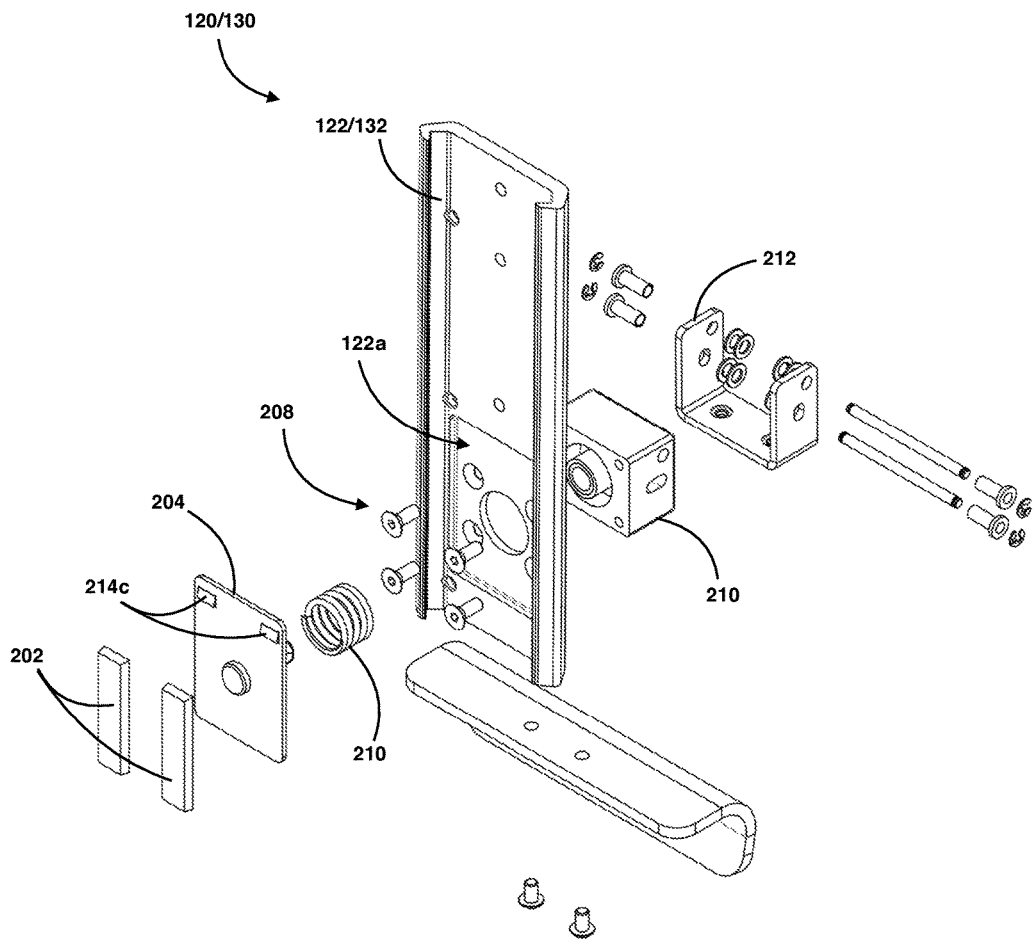
FIG. 6B illustrates a partial exploded view of the lift lever and mount of the disclosure described herein.
Figure 7A:
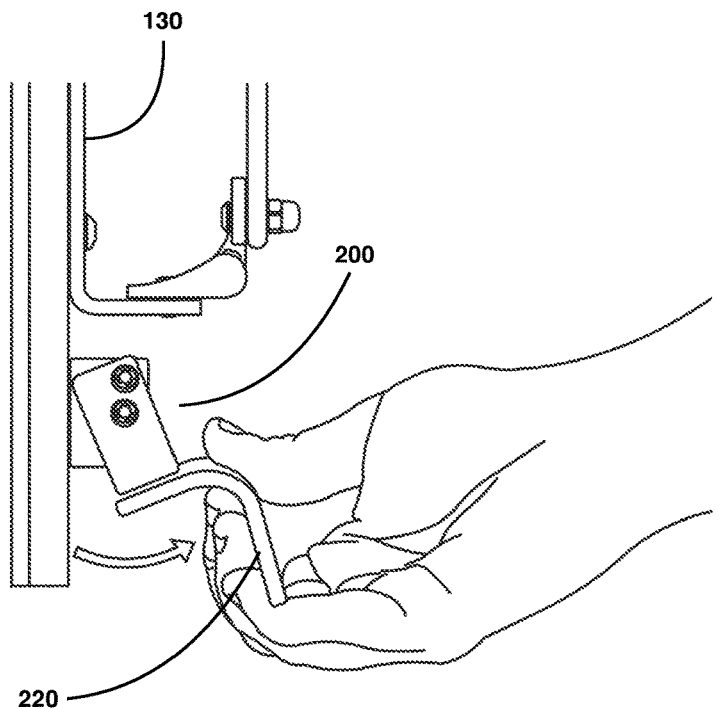
FIG. 7A illustrates a partial side view for one method of operating the lift lever and guide assembly of the keyboard mount of the disclosure described herein.
Figure 7B:
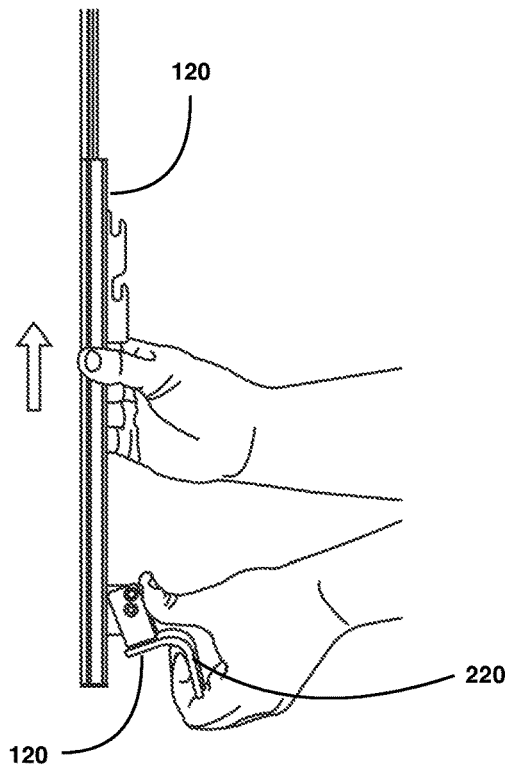
FIG. 7B illustrates a partial side view for one method of installing and operating the lift lever and guide assembly of the monitor mount of the disclosure described herein.

FIGS. 6A-6B illustrate more detailed exploded views for the lever lift 200 of the disclosure described herein. Specifically, lever lift 200 includes the braking bracket 204 having the pair of braking or friction pads 202 affixed to the outer surface of bracket 204. Here, bracket 204 further includes an elongated protrusion 204a, wherein protrusion 204a is inserted within an annular opening of protrusion 210c of block or bracket 210, and further wherein compression spring 206 becomes disposed over protrusion 210c, wherein protrusion 204a thereby operates as a compression piston within block or bracket 210 and providing a biased pivoting action for the lever lift 200.

Figure 4A:
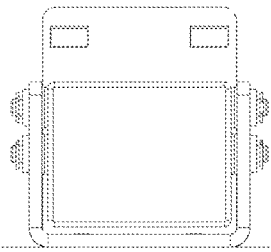
FIG. 4A illustrates a front view of the lift lever of the disclosure described herein.
Figure 4B:
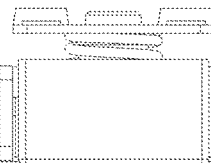
FIG. 4B illustrates a top view of the lift lever of the disclosure described herein.
Figure 4C:
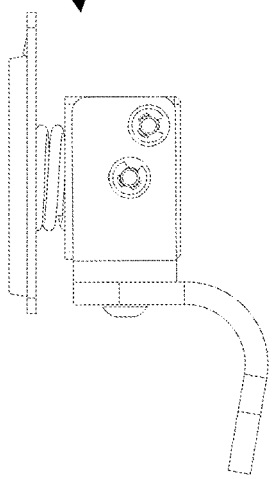
FIG. 4C illustrates a side view of the lift lever of the disclosure described herein.

Still referring to FIG. 6A-6B, block or bracket 210 further includes an aperture 210a and a slot 210b on each side of block or bracket 210, wherein aperture 210a and slot 210b are configured to be axially aligned with openings 212a and 212b on each side of U-bracket 212. More specifically, block or bracket 210 is configured to be disposed within the opening and between the upright arms of U-bracket 212 and secured therein. In particular, U-bracket 212 includes elongated pins, rods, or bars 214a and 216a disposed therein, and each having threaded ends for securing with threaded end caps or shoulder collars 214a, 218a with rod 216a and end caps or shoulder collars 214b and 218b with rod 216b, respectively. Shoulder collars or caps 214a, 214b, 218a, and 218b allow for a minimized friction or friction free operation of the pins 216a and 216b, or operate as bearings. Here, rod 216a is inserted through openings 212a on each side of U-bracket 212, a plurality of washers/spacers, and through openings 210a on each side of bracket 210 and secured in place via caps or collars 214a and 218a. Further, at least one washer or spacer may separate (or provide a gap) between the exterior of block or bracket 210 with the interior of U-bracket 212, as shown in FIGS. 4A-4C, thereby minimizing friction or providing a frictionless pivoting action. In addition, one or more retaining rings 215 may further secure rods and caps 214a, 214b, 216a, 216b, 218a, and 218b. Similarly, rod 216b is inserted through openings 212b on each side of U-bracket 212 and opening 204b of bracket 204, a plurality of washers/spacers, and through opening 210b of block or bracket 210 and secured in place via caps or collars 214b and 218b. Hence, rod 216b further couples and secures braking bracket 204 to U-bracket 212. Further, at least one washer or spacer may separate (or provide a gap) between the exterior of bracket 210 with the interior of U-bracket 212, as shown in FIGS. 4A-4C, thereby allowing the two parts to pivot relative to each other with minimal friction. In addition, the lift, lock, and release handle or lever 220 further includes a pair of apertures 220b that axially align with apertures 212c on U-bracket 212, wherein a pair of bolts or caps 220a secure lever 220 with U-bracket 212.

FIG. 6B better illustrates a partial assembly of lever lift 200 onto a mount, such as mount 120 or 130. Here, each mount includes its own track or guide 122 or 132, wherein either of guides 122 or 132 are further mounted and secured to main guide 110 of assembly 100. Here, it is guide 122 or 132 of either mount 120 or 130 that slides along main track 110, and wherein the lever lift 200 operates to either release or stop movement of guide 122 or 132 on track 110 via its brake pads 202 engaging the surface of track 110, which is better illustrated in FIG. 8C.

Referring to FIGS. 6A-6B and 7A-7B, U-bracket 212 is configured such that it pivots relative to bracket 210 when a user pulls in an outward direction on handle 220. More specifically, U-bracket pivots about the axis of rod 216a, and wherein rod 216b (which secures braking bracket 204 to U-bracket 212) moves in a transverse direction or slightly rotational direction within each slot 210b of fixed bracket 210. In operation, one end of spring 206 is abutted against the wall surface of bracket 204 and another end of spring 206 is abutted against the interior annular wall 210dd of bracket 210, as further shown in FIGS. 5A-5D. Here, when assembled on to guides 122 or 132 of mounts 120 or 130, fixed bracket 210 is securely affixed to guides 122 or 122 via threaded fasteners 208 received through a plurality of openings on either guide 122 or 132 and further received within openings 210e of bracket 210, thereby securing bracket 210 to either of guides 122 or 132. In addition, either of guides 122 or 132 may also include a recessed or cut-out region 122a in the shape of braking bracket 204, thereby securely holding bracket 204 within recessed region 122a. Such a configuration allows the exterior face of bracket 204 to be flush with the interior face of either guides 122 or 132. In addition, a pair of stamped protrusions 204c are configured to hold and secure (or operate as a stop) for braking friction pads 202.

FIGS. 8A-8C illustrate various views for one non-limiting assembly of keyboard mount 130 of apparatus 100. Here, mount 130 includes a tray 136 that is secured to guide 132 via hinge 138 secured to bracket 134, wherein bracket 134 is further secured to track 132. Here, hinge 138 allows tray 136 to be secured at a right angle with respect to guide 132, but also allows tray 136 to pivot in a stowed position, such as in an upright position, as shown in FIG. 2B. Further, tray 136 also includes padding 136a secured to the outer edge of track 136. Here, padding 136a not only provides wrist support for a user but also operates as a safety mechanism that provides a cushion between a user's fingers. More specifically, when tray 136 is in an upright position as shown in FIG. 2B, and a user lowers monitor mount 120 via its lever lift 200, then the padding 136a provides a cushion for a user's fingers if the user inadvertently lowers the lever lift 200 too far and pinches their fingers in between the edge of tray 136 and the handle 220 of the lever lift 200 on mount 120. FIGS. 8B and 8C further illustrate top views of mount 130 and lever lift 200. In particular, sliding guide 132 (or guide 122) is disposed over and slid along track 110, wherein guide 132 or 122 may include a frictionless surface, roller bearings, slide assist agent, plastic bearings, tape, or coatings that allow for a smooth glide along track 110. In addition, track 110 includes at least a pair of grooves, or recessed rails on its surface. Here, brake pads 202 are configured to align and engage with the grooves of track 110 thereby operating as a stop for mount 130 or 120. Here, when lever lift 200 is engaged, brake pads 202 are in firm contact with the surface of track 110. However, when lever lift 200 is dis-engaged or actuated by a user, as shown in 7A, then brake pads 202 dis-engage from the surface of track 110, thereby allowing either of guide 122 or 132 to freely slide or glide along track 110 in any direction.

FIGS. 9A-9C illustrate a cord or cable management device cover for apparatus 100 of the disclosure described herein. Here cable management apparatus or cover 150 is generally shaped in a J-configuration that includes a top plate 150a and a lower plate 150b. In addition, foam or padded spools 152 and 154 are disposed between the top plate and lower plate, wherein spools 152 and 154 can allow one or more cables or cords to be disposed or wrapped and over around, which is further shown in FIG. 10 in one embodiment. Here, cylindrical blocks, pads, or spools 152 and 154 are configured to pinch or press cords or cables within space 150c against an interior wall of cover 150 adjacent to either spools 152 or 154, thereby stopping or preventing the cables from moving upwards or downwards with respect to spools 152 and 154, while at least partially concealing the cables from view. In this configuration, the full weight of the cables is not exerted on the connection points or connectors of the electronic devices or peripherals, such as the monitor, and further avoids or eliminates any kinks in the cables. Alternatively, another securement mechanism in addition to or in lieu of spools 152 and 154 may be used to fix or secure the cables. In contrast, in another embodiment, spools 152 and 154 may be configured or spaced away from the interior wall of cover 150 to allow the cables within cover 150 to be suspended and move freely within cover 150 while at least partially concealing the cables from view. In this other configuration, spools 152 and 154 may also be configured to rotate or spin freely, while a separate member (not shown) in or around the electronic device or peripheral (i.e. monitor) holds or maintains the cables to prevent unwanted weight on the connection points or connectors of the electronic device or peripheral.

Figure 10:
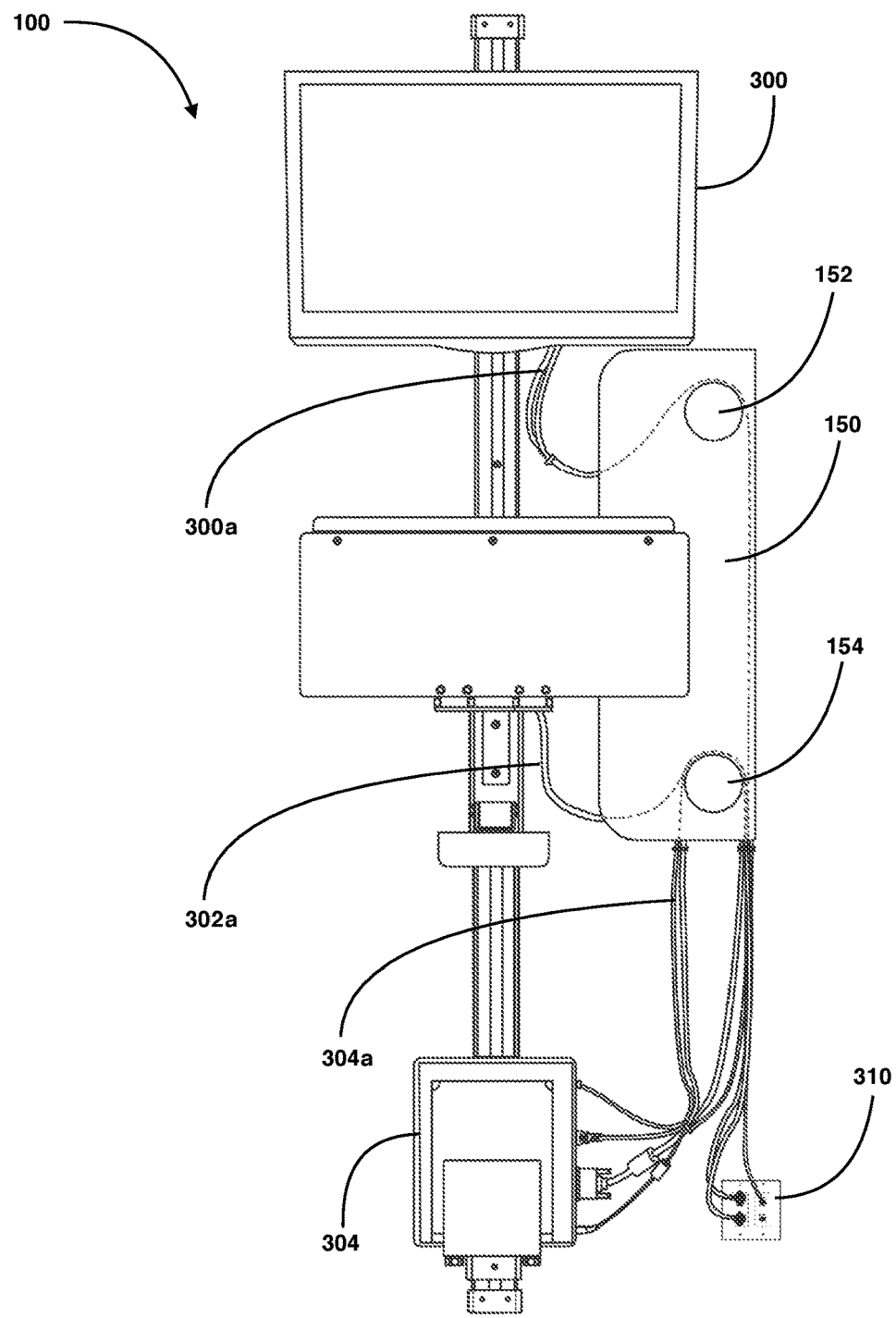
FIG. 10 illustrates a front view of the wall-mounted workstation sliding guide assembly and one non-limiting embodiment configuration for managing various cables with the cable management apparatus.

FIG. 10 illustrates one embodiment of apparatus 100 in fully assembled form, with a plurality of devices secured thereto. Specifically, monitor 300 mounted to mount 130 may include one or more cables 300a disposed within cover 150 over spool 152 and further coupled to computing unit 304 or electrical wall outlet 310. Here, as monitor 300 is moved up or down along track 110 via mount 130 and lever lift 200, cable 300a will have enough slack (and move within cover 150 if needed) to allow free and un-tethered movement of monitor 300. Similarly, keyboard or input devices may also include one or more cables 302a disposed within cover 150 over spool 154 and further coupled to computing unit 304 or electrical wall outlet 310. Here, as keyboard or input devices are moved up or down along track 110 via mount 120 and lever lift 200, cable 302a will have enough slack (and move within cover 150 if needed) to allow free and un-tethered movement of the keyboard or input devices. In addition, computing unit may also include one or more cables that wrap over spool 154 of cover 150 and to the electrical wall outlet 310.

FIGS. 11A-11B illustrate another embodiment for personal computing unit or thin client holder mount 140. In particular, mount 140 can also be used to hold a monitor 300 in lieu of a computing device or thin client unit. Alternatively, mount 140 can hold not only monitor 300 but also the computing unit or thin client unit 304. In addition, mount 140 may also be configured with lever lift 200 (not shown) to allow simple adjustment of mount 140 on track 110.

It is contemplated within the scope of the disclosure described herein that apparatus 100 may be configured to accommodate any type of user, whether seated or standing, various heights, and/or disabilities. For example, the following tables illustrate various sample configurations for assembly 100.

TABLE 1 illustrates provides some sample height measurements for various devices secured to apparatus 100 for a seated user of the apparatus 100.

TABLE 1

| DEVICES USED | LOW | HIGH | RANGE | TRACK | SPACE FROM TRACK TO FLOOR |
|---|---|---|---|---|---|
| Keyboard and Monitor | 19.47" | 53.71" | 34.24" | 51" | 15' |
| Monitor Only* | 39.39" | 53.71" | 14.3" | 39" | 30" |
| Touchscreen Height* | 32" | 48" | 16" | 39" | 21" |
| Keyboard Only* | 19.47" | 30.96" | 11.5" | 27" | 15" |

*Monitor measurement is from center of monitor for reference. Some users may prefer to have the monitor slightly lower than centered to eye height. Since vertical placement of attachment hole patterns on the backs of monitors vary, only estimates for positioning can be outlined here. Preference from user to user can vary - track height and track to floor figures are best estimates that should apply in most applications. The standard low profile lever lift keyboard system reaches about 12.5" from the wall.

TABLE 2 illustrates provides some sample height measurements for various devices secured to apparatus 100 for a standing user of the apparatus 100.

TABLE 2

| DEVICES USED | LOW | HIGH | RANGE | TRACK | SPACE FROM TRACK TO FLOOR |
|---|---|---|---|---|---|
| Keyboard and Monitor | 35.24" | 70.14" | 34.9" | 51" | 31" |
| Monitor Only* | 54.09" | 70.14" | 16.1" | 39" | 45" |
| Touchscreen Height* | 45" | 66" | 21" | 39" | 36" |
| Keyboard Only* | 35.24" | 46.62" | 11.4" | 27" | 31" |

*Monitor measurement is from center of monitor for reference. Some users may prefer to have the monitor slightly lower than centered to eye height. Since vertical placement of attachment hole patterns on the backs of monitors vary, only estimates for positioning can be outlined here. Preference from user to user can vary - track height and track to floor figures are best estimates that should apply in most applications. The standard low profile lever lift keyboard system reaches about 12.5" from the wall.

TABLE 3 illustrates provides some sample height measurements for various devices secured to apparatus 100 for both a standing and sitting user of the apparatus 100.

| DEVICES USED | LOW | HIGH | RANGE | TRACK | SPACE FROM TRACK TO FLOOR |
|---|---|---|---|---|---|
| Keyboard and Monitor | 19.47" | 70.14" | 50.7" | 78" | 15" |
| Monitor Only* | 39.39" | 70.14" | 31" | 51" | 30" |
| Touchscreen Height* | 32" | 66" | 34" | 51" | 21" |
| Keyboard Only* | 19.47" | 46.62" | 11.4" | 27" | 15" |

*Monitor measurement is from center of monitor for reference. Some users may prefer to have the monitor slightly lower than centered to eye height. Since vertical placement of attachment hole patterns on the backs of monitors vary, only estimates for positioning can be outlined here. Preference from user to user can vary - track height and track to floor figures are best estimates that should apply in most applications. The standard low profile lever lift keyboard system reaches about 12.5" from the wall.

Having thus described the several embodiments of the present disclosure described herein, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention. Although the present disclosure described herein has been described in considerable detail with reference to certain preferred versions or embodiments thereof, other versions and embodiments are possible. Therefore, the spirit and scope of the appended claims should not be limited to the description of the embodiments contained herein.

The invention claimed is:

1. A workstation support assembly, comprising:
a mount having a guide, wherein the mount is configured to slide via the guide along an elongated track;
a release member, the release member comprising: a handle;
a first bracket;
a friction member secured to the first bracket, wherein the friction member is configured to engage the elongated track;
a second bracket;
a compression spring disposed at least partially within the second bracket and abutted against the first bracket; and
a third bracket secured to the second bracket, wherein the handle is coupled to the third bracket and configured to engage or disengage the friction member from the elongated track.

2. The workstation support assembly of claim 1, wherein the mount is configured to support one or more of a display, keyboard, mouse, user input device, and computing device.

3. The workstation support assembly of claim 1, wherein the friction member is comprised of a rubber or polymer based pad.

4. The workstation support assembly of claim 1, wherein the compression spring is at least partially disposed within the first mount.

5. The workstation support assembly of claim 4, wherein the compression spring is further disposed between the first bracket and the second bracket.

6. The workstation support assembly of claim 5, wherein the third bracket is configured to pivot relative to the second bracket.

7. The workstation support assembly of claim 1, wherein the mount further comprises a keyboard support tray, and wherein the keyboard support tray is configured to pivot relative to the mount.

8. The workstation support assembly of claim 1, wherein the mount further comprises a monitor or display support member.

9. The workstation support assembly of claim 1, further comprising a cover for one or more cables or cords.

10. The workstation support assembly of claim 9, wherein the cover further comprises a first spool and a second spool configured to support the one or more cables or cords.

11. The workstation support assembly of claim 10, wherein the first and second spool at least partially secure the one or more cables or cords.

12. A workstation support assembly, comprising:
a carrier, wherein the carrier is configured to slide along an elongated track;
the carrier further comprising a stop member, the stop member comprising: a handle;
a first bracket having a friction member on a first side and a protrusion member on a second side;
a second bracket having an opening for at least partially receiving the protrusion member of the first bracket within the opening;
a compression spring disposed between the first bracket and second bracket; and
a third pivoting bracket coupled to the second bracket and wherein the handle is coupled to the third bracket and configured to engage or disengage the friction member from the elongated track.

13. The workstation support assembly of claim 12, wherein the carrier further comprises a keyboard support tray, wherein the keyboard support tray is configured to pivot relative to the carrier.

* * * * *